Nov. 8, 1966  L. E. HAY  3,284,556
METHOD FOR INJECTION OR TRANSFER MOLDING
LAMINATED PRESSURE VESSELS
Filed Jan. 25, 1963
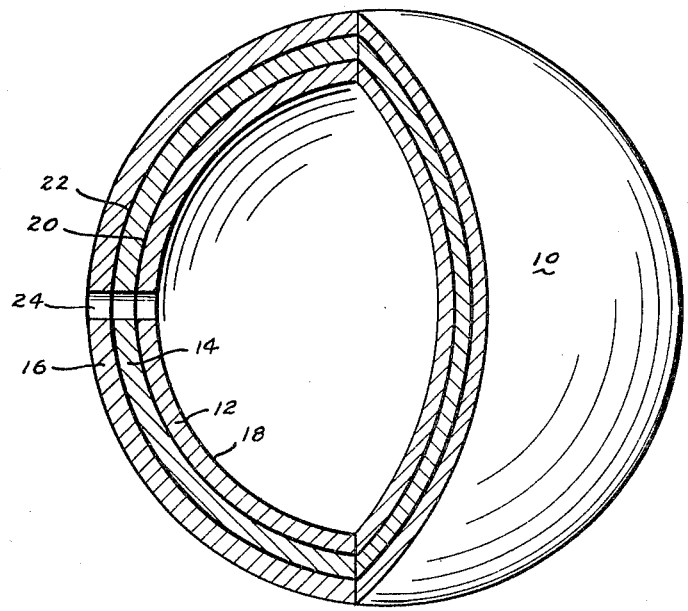
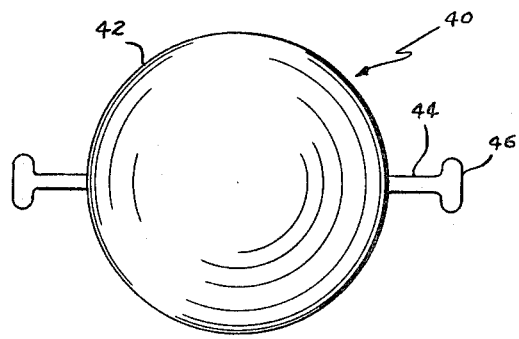
INVENTOR
LOUIS E. HAY
BY
ATTORNEYS 3,284,556
METHOD FOR INJECTION OR TRANSFER MOLDING LAMINATED PRESSURE VESSELS
Louis E. Hay, 847 Woodhill Road, Dayton, Ohio
Filed Jan. 25, 1963, Ser. No. 254,032
8 Claims. (Cl. 264—221)

The invention described herein may be manufactured and used by or for the Government for governmental purposes without the payment to me of any royalty thereon.

This invention relates to pressure vessels having a laminated body comprising two or more shells in firm proximity. This invention further provides an extremely practical and inexpensive method for manufacturing laminated pressure vessels such as disclosed in United States Patent No. 3, 207,352, titled Laminated Pressure Vessels and issued September 21, 1965.

The referenced United States patent discloses laminated pressure vessels having a plurality of contiguous shells; each shell from the inside out being formed of a material having a higher modulus of elasticity than the preceding shell. The patent further discloses a method of filament winding such vessels. The present invention is directed toward making laminated pressure vessels having more than one shell, without regard to the reason for such plurality. For example, the material selection may be based on modulus of elasticity, chemical requirements, permeability requirements or temperature requirements.

Vessels having a laminated or plurality shell structure may be manufactured by the injection molding process to be disclosed. This process will be found to be especially useful for the mass production of like vessels.

The primary object of this invention is to mass produce like laminated pressure vessels in an economical manner.

Another object of this invention is to mass produce like laminated pressure vessels with the minimum amount of labor.

A further object of this invention is to mass produce like laminated pressure vessels having uniform physical characteristics.

Yet another object of this invention is to produce a laminated pressure vessel which may be prestressed.

A still further object of this invention is to injection mold a pressure vessel having a plurality of shells at least one of which may be formed of an injected fluid material impregnated with solid filaments of metallic or nonmetallic materials.

Yet a further object of this invention is to produce a multi-shell pressure vessel on which the outer shell may be formed of a color coded material.

Additional objects, advantages and features of the invention reside in the construction, arrangement and combination of parts involved in the embodiment of the invention as will appear from the following description and accompanying drawings wherein:

FIG. 1 is a representative pressure vessel in quarter section, and with the wall in exaggerated thickness to more clearly show construction details, and FIG. 2 is a reduced scale view of the mandrel used in fabricating the vessel of FIG. 1.

The vessel as depicted by FIG. 1 is shown, for convenience, as having three contiguous shells; although any number of shells greater than one may be used within the spirit and intent of the invention. The vessel referred to generally as vessel 10, has an inner or first shell 12, an intermediate or second shell 14, and an outer or third shell 16. In addition to the three shells which constitute the basic elements of the vessel 10, there may or may not be an inner liner 18 of metallic or nonmetallic material and thin coating layers 20 and 22 between the shells. The inner liner would be used primarily for chemical reasons or when it is desired to have the contents within the vessel in contact with a nonpermeable material. The coating layers would be of an elastomeric material such as butyl rubber; and since such coatings are made thin to have little compressibility, they serve to absorb strain differentials and distribute stress between the shells. Also shown is a representative opening 24; all pressure vessels having at least one opening.

Laminated pressure vessels fabricated in accordance with the method of this invention would be injection molded in progressive injection molds. That is, the inner shell would be molded in a mold having a cavity the size of the outer surface of the shell. This shell would then be transferred and relocated into a second mold having a larger cavity the size of the second shell, and after the second shell is molded in place, the partially completed vessel is again transferred and relocated in the next larger mold. This procedure is repeated until the final or outer shell is molded in place.

All pressure vessels must have openings through the wall of the vessel. Such openings, which vary in size, shape and number, may be formed by methods well known to the art. A suitable mandrel, such as shown on FIG. 2, is cast or otherwise formed of a low melting temperature metal or alloy such as Wood's metal. The mandrel, referred to as mandrel 40, has a main portion 42 made to the configuration of the cavity in the vessel to be fabricated, stems 44 not to exceed in cross-section the hole size to be formed in the vessel, and locating lugs 46. The locating lugs on the mandrel are used to position the mandrel in the injection molds, the same lugs being used in all progressive molds. After the vessel has been fabricated with all required shells, it is heated sufficiently to melt the material forming the mandrel which is then poured from the interior of the vessel. Dependent upon the materials being injection molded, size of openings in the vessel, and upon individual preferences, the mandrel in many cases may also be formed of suitable cold-hardening, soluble materials such as the thermoplastic Paraplast. Mandrels formed of such materials, because of their light weight and handling ease, have excellent applications on open end vessels such as missile cases and jet nozzles. Vessels to be fabricated with an inner liner may use the inner liner as a portion of the mandrel. The low melting metal or the cold setting thermoplastic may be poured into the liner and the stems and locating lugs extended through the holes in the inner liner.

The shells comprising the walls of the vessel may be brought into extremely close proximity, or even prestressed. For example, after the first shell has been molded in place, this shell and the mandrel are cooled either naturally or artificially before they are placed into the next mold. As the newly applied hot shell is molded around the preceding cooler shell and mandrel, the shells will come into firm union, the inner shell through expansion due to temperature rise and the outer hot shell by shrinkage due to temperature decrease.

Vessels made in accordance with the process may be permanently color coded. This may be accomplished, for example, by forming the outer shell of a colored plastic, or by mixing material such as colored threads into clear plastic.

Although the drawing depicts a spherical vessel, it is the intent to apply the disclosed process to any shaped laminated closed vessel or to open end vessels such as missile cases and jet nozzles; the drawing being merely to illustrate the shell build-up of the disclosed process. It is, therefore, to be understood that the terms "pressure vessel" and "vessel" as used in this specification are inclusive of all vessels, both open and closed.

Likewise, the term "injection molding" includes not only the well known injection process, but any process where there is a material transfer through an orifice or opening into a cavity or mold. The material transferred may be any fluid or semi-fluid material; or such materials carrying solids such as glass fiber filaments or short metallic filaments. Such solid materials will criss-cross and intermix to reinforce the shell being formed.

While a preferred form of the invention has been shown and described, various modifications and substitutions of equivalents will occur to those skilled in the art after a study of the foregoing disclosure. Hence, the disclosure should be taken as illustrative rather than in a limiting sense; and it is the desire and intention to reserve all modifications within the scope of the appended claims.

I claim:

1. The method of fabricating a laminated pressure vessel having an inner shell and an outer contiguous shell formed by injection molding in progressive molds and comprising: the method of injection molding the inner shell onto a disposable mandrel removably located within the first mold, then relocating the said disposable mandrel together with the said inner shell in a second mold having a cavity larger than the cavity in the first mold and injection molding the outer shell onto the said inner shell, and then disposing said mandrel from said pressure vessel.

2. The method of fabricating a laminated pressure vessel having at least three contiguous shells by injection molding in a series of progressive molds, each mold in the series having a larger cavity than the preceding mold for forming one of the said contiguous shells and comprising: the method of injection molding the first shell in the smallest mold onto a disposable mandrel removably located within the smallest mold, then removing the subassembly consisting of the said first shell and the mandrel from the said smallest mold and relocating said subassembly in the second smallest progressive mold, then injection molding the second shell onto the said first shell, then removing the subassembly consisting of the said first and second shells with the mandrel from the said second mold and relocating in the next progressive mold where the third shell is injection molded onto the said second shell; repeating if necessary the relocating and injection process until a shell has been injection molded in each mold of the series, and then disposing the mandrel from said pressure vessel.

3. The method of fabricating a laminated pressure vessel having an inner shell, an outer contiguous shell and an inner liner within the inner shell, the shells being formed by injection molding in progressive molds and comprising: the method of forming a mandrel by filling said inner liner with disposable cold setting material extending outwardly through at least one opening in said inner liner to form locating lugs for locating the mandrel so formed in the first mold, then injection molding the said inner shell onto the mandrel, then removing the subassembly consisting of the said inner shell and mandrel from the first mold and relocating said subassembly in the second mold having a cavity larger than the cavity in the first mold, then injection molding the outer shell onto the said inner shell, and then disposing the mandrel from said pressure vessel.

4. The method of fabricating a laminated pressure vessel having at least three contiguous shells and an inner liner within the inner shell, the shells being formed by injection molding in a series of progressive molds, each mold in the series having a larger cavity than the preceding mold for forming one of the said contiguous shells and comprising: the method of forming a mandrel by filling said inner liner with disposable cold setting material extending outwardly through at least one opening in said inner liner to form locating lugs for locating the mandrel so formed in the smallest mold, then injection molding the inner shell onto the mandrel, then removing the subassembly consisting of the said inner shell and the mandrel from the said smallest mold and relocating said subassembly in the second smallest progressive mold, then injection molding the second shell onto the said inner shell, then removing the subassembly consisting of the said inner and second shells with the mandrel from the said second mold and relocating in the next progressive mold where the third shell is injection molded onto the said second shell; repeating if necessary the relocating and injection process until a shell has been injection molded in each mold of the series, and then disposing the mandrel from said pressure vessel.

5. The method of fabricating a laminated pressure vessel having an inner shell, an outer shell, and a coating of elastomeric stress distributing material between the shells, the shells being formed by injection molding in progressive molds and comprising: the method of injection molding the inner shell onto a disposable mandrel removably located within the first mold, then removing the subassembly comprising the said inner shell and the mandrel from the first mold, then applying a coating of elastomeric material to the outer surface of said inner shell, then relocating the said subassembly in a second mold having a cavity larger than the cavity in the first mold, then injection molding the outer shell onto the said elastomeric coating and then disposing the mandrel from said pressure vessel.

6. The method of fabricating a laminated pressure vessel having at least three shells formed by injection molding in a series of progressive molds, each mold in the series having a larger cavity than the preceding mold for forming one of the said shells, and having a coating of elastomeric stressing distributing material between adjacent shells and comprising: the method of injection molding the first shell in the smallest mold onto a disposable mandrel removably located within the smallest mold, then removing the subassembly consisting of the said first shell and the mandrel from the smallest mold, then applying a coating of elastomeric material to the outer surface of said first shell, then relocating said subassembly in the second smallest progressive mold, then injection molding the second shell onto the said elastomeric coating, then removing the subassembly consisting of the said first and second shells having said elastomeric coating in between and the attached mandrel from the said second mold, then applying a coating of elastomeric material to the outer surface of said second shell, then relocating the said subassembly in the next progressive mold where the third shell is injection molded onto the elastomeric coating on said second shell; repeating if necessary the coating, relocating and injection process until a shell has been injection molded in each mold of the series and then disposing the mandrel from said pressure vessel.

7. The method of fabricating a laminated pressure vessel having an inner shell, an outer shell, an inner liner within said inner shell, and a coating of elastomeric stress distributing material between the shells; the shells being formed by injection molding in progressive molds and comprising: the method of forming a mandrel by filling said inner liner with disposable cold setting material extending outwardly through at least one opening in said inner liner to form locating lugs for locating the mandrel so formed in the first mold, then injection molding the said inner shell onto the said mandrel, then removing the subassembly comprising the said inner shell and the mandrel from the first mold, then applying a coating of elastomeric material to the outer surface of said inner shell, then relocating the said subassembly in a second mold having a cavity larger than the cavity in the first mold, then injection molding the outer shell onto the said elastomeric coating, and then disposing the mandrel from said pressure vessel.

8. The method of fabricating a laminated pressure vessel having at least three shells, an inner liner within the inner shell, and having an elastomeric stress distributing material between adjacent shells; said shells being formed by injection molding in a series of progressive molds, each mold in the series having a larger cavity than the preceding mold for forming one of said shells and comprising: the method of forming a mandrel by filling said inner liner with disposable cold setting material extending outwardly through at least one opening in said inner liner to form locating lugs for locating the mandrel so formed in the smallest mold, then injection molding the inner shell onto the said mandrel, then removing the subassembly consisting of the said inner shell and the mandrel from the said smallest mold, then applying a coating of elastomeric material to the outer surface of said inner shell, then relocating said subassembly in the second smallest progressive mold, then injection molding the second shell onto the said elastomeric coating, then removing the subassembly consisting of the said inner and second shells having said elastomeric coating in between and the attached mandrel from the said second mold, then applying a coating of elastomeric material to the outer surface of said second shell, then relocating the said subassembly in the next progressive mold where the third shell is injection molded onto the elastomeric coating on said second shell; repeating if necessary the coating, relocating and injection process until a shell has been injection molded in each mold of the series, and then disposing the mandrel from said pressure vessel.

References Cited by the Examiner

UNITED STATES PATENTS

| | | | |
|---|---|---|---|
| 720,482 | 2/1903 | Richards | 264—317 |
| 3,057,016 | 10/1962 | Schilling | 264—328 X |
| 3,178,497 | 4/1965 | Moscicki | 264—265 X |

FOREIGN PATENTS

| | | |
|---|---|---|
| 826,685 | 2/1960 | Great Britain. |
| 840,041 | 7/1960 | Great Britain. |

ROBERT F. WHITE, *Primary Examiner.*

L. S. SQUIRES, *Assistant Examiner.*